United States Patent
Taylor et al.

(10) Patent No.: US 8,437,040 B2
(45) Date of Patent: May 7, 2013

(54) METHOD AND SYSTEM FOR DIGITALLY CONTROLLING IMAGE PRINTING SYSTEM TO ACHIEVE DESIRED COLOR DENSITY OF PRINTED IMAGE

(75) Inventors: Douglas Raymond Taylor, Webster, NY (US); Brian Robert Conrow, Webster, NY (US); Shawn Patrick Updegraff, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 449 days.

(21) Appl. No.: 12/900,169

(22) Filed: Oct. 7, 2010

(65) Prior Publication Data
US 2012/0086983 A1    Apr. 12, 2012

(51) Int. Cl.
*H04N 1/60* (2006.01)
(52) U.S. Cl.
USPC ......... 358/1.9; 358/3.01; 358/3.02; 358/3.06; 358/3.24; 358/3.26; 358/3.23; 358/518
(58) Field of Classification Search .................... 358/1.9, 358/3.01–3.26, 518–525
See application file for complete search history.

(56) References Cited

U.S. PATENT DOCUMENTS

| | | | | |
|---|---|---|---|---|
| 5,739,927 | A * | 4/1998 | Balasubramanian et al. | 358/518 |
| 5,777,656 | A * | 7/1998 | Henderson | 347/251 |
| 5,877,787 | A * | 3/1999 | Edge | 347/19 |
| 6,697,582 | B1 * | 2/2004 | Scheuer | 399/49 |
| 6,917,448 | B2 * | 7/2005 | Koifman et al. | 358/3.21 |
| 7,024,152 | B2 | 4/2006 | Lofthus et al. | |
| 7,136,616 | B2 | 11/2006 | Mandel et al. | |
| 7,239,820 | B2 * | 7/2007 | Donaldson | 399/49 |
| 7,425,972 | B2 * | 9/2008 | Updegraff et al. | 347/132 |
| 7,505,173 | B2 | 3/2009 | Viturro et al. | |
| 7,880,930 | B2 * | 2/2011 | Zhang et al. | 358/1.9 |
| 8,072,648 | B2 * | 12/2011 | Monga et al. | 358/3.06 |
| 8,274,706 | B2 * | 9/2012 | Monga et al. | 358/3.06 |
| 2004/0165199 | A1 * | 8/2004 | Klassen et al. | 358/1.9 |
| 2006/0077488 | A1 * | 4/2006 | Zhang et al. | 358/504 |

* cited by examiner

*Primary Examiner* — Richard Zhu
(74) *Attorney, Agent, or Firm* — Pillsbury Winthrop Shaw Pittman, LLP

(57) ABSTRACT

A method for controlling a tone reproduction curve of an image printing system includes generating an actual printed image tone reproduction curve using printed image data from a printed image sensor; determining a set of adjusted contone values by comparing the actual printed image tone reproduction curve with a target printed image tone reproduction curve, where the adjusted contone values being representative of the print contone values at which target color density data of the printed image is achieved in the image printing system; and determining adjusted image transfer surface reflectance data to update a target image transfer surface tone reproduction curve, where the adjusted image transfer surface reflectance data being obtained by interpolating the target image transfer surface tone reproduction curve at the adjusted contone values; and controlling subsequent toner image data to achieve the updated target image transfer surface tone reproduction curve.

10 Claims, 5 Drawing Sheets

METHOD AND SYSTEM FOR DIGITALLY CONTROLLING IMAGE PRINTING SYSTEM TO ACHIEVE DESIRED COLOR DENSITY OF PRINTED IMAGE

BACKGROUND

1. Field

The present disclosure relates to a method and a system for controlling a tone reproduction curve (TRC) of an image printing system.

2. Description of Related Art

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on an imaging device or printer from one day to another, from one week to the next, month after month. Colors on a printer tend to drift over time due to ink/toner variations, temperature fluctuations, type of media used, environment, etc. There has been a long felt commercial need for efficiently maintaining print color predictability, particularly as electronic marketing has placed more importance on the accurate representation of merchandise in illustrative print or display media.

Color printing characterization is a crucial task in color management. The characterization process essentially establishes a relationship between device dependent, e.g., printer CMY, and device independent, e.g., CIELAB values. Several color management tasks such as derivation of ICC profiles, color transforms for calibration, etc. benefit from an accurate mathematical characterization of the physical device.

The most popular technique to build a printer characterization transform involves printing and measuring a large set of color samples, i.e., CMY(K) patches, in conjunction with mathematical fitting and interpolation to derive CMY(K) to Lab mappings. The accuracy of the characterization transform clearly depends on the number (N) of patches printed and measured. One aspect of patch measurement comprises a closed-loop uniformity correction system that generates multiple full-width patches of a single density across the whole printer page or photoreceptor belt (i.e., the entire cross-process position of the image printing system). Such full-width patches are measured by a full-width array sensor during cycle up to obtain a printer model of the tone reproduction curve (TRC) at each inboard to outboard pixel column. The measurement can then show the amount of toner or print ink printed at each position on that page by the particular halftone screen then used. Any variations in the TRCs (i.e. variations from the true intended color) are compensated for in the image path via remapping of the halftone TRC. Such remapping is generally referred to as spatially varying TRC corrections (SVT) and these remappings are unique for each color and each halftone screen. Also, in a conventional process control patch implementation, control patches for each developer housing are created in an inter-document zone (IDZ) between successive images on a drum or belt type photoreceptor that moves along a process direction. These control patches are sensed with toner patch sensors and actuators are adjusted to maintain a three-point toner response curve (TRC).

In the image printing system (that is using the closed-loop uniformity correction system), the absolute color is generally controlled in response to measurements of the three point TRC at the reference location using Vmag (development roll voltage), laser power, and Vmc (voltage difference between the development roll and the charged area of an image transfer surface) as actuators and color calibration is accomplished via a TRC halftone dot linearization routine. Because the reference location color (TRC) is controlled and calibrated through other means, there is no need for the closed-loop uniformity correction system to change the TRC at this reference location. Also, the closed-loop uniformity correction system corrects the TRC at all pixels to match the reference TRC while leaving the reference location unchanged (on average)

The present disclosure provides improvements in methods and systems for controlling a tone reproduction curve (TRC) of an image printing system.

SUMMARY

According to one aspect of the present disclosure, a computer-implemented method for controlling a tone reproduction curve (TRC) of an image printing system is provided. The method is implemented in a computer system comprising one or more processors configured to execute one or more computer program modules. The method includes printing a printed image by forming a toner image on an image transfer surface based on input image data and transferring the toner image to an output media to form the printed image; measuring, during the printing of the printed image, the toner image on the image transfer surface using an image transfer surface sensor to obtain toner image data, wherein the toner image data comprises a set of image transfer surface contone values representative of an area coverage of the toner image on the image transfer surface; controlling the toner image data to achieve a target image transfer surface tone reproduction curve; measuring the printed image on the output media using a printed image sensor to obtain printed image data, wherein the printed image data comprises a set of print contone values representative of an area coverage of the printed image on the output media; generating an actual printed image tone reproduction curve using the printed image data; determining a set of adjusted contone values by comparing the actual printed image tone reproduction curve with a target printed image tone reproduction curve, the adjusted contone values being representative of the print contone values at which target color density data of the printed image is achieved in the image printing system; determining adjusted image transfer surface reflectance data to update the target image transfer surface tone reproduction curve, the adjusted image transfer surface reflectance data being obtained by interpolating the target image transfer surface tone reproduction curve at the adjusted contone values; and controlling subsequent toner image data from the image transfer surface sensor to achieve the updated target image transfer surface tone reproduction curve.

According to another aspect of the present disclosure, a system for controlling a tone reproduction curve (TRC) of an image printing system is provided. The system includes a print engine, an image transfer surface sensor, a printed image sensor, a processor and a controller. The print engine is configured to form a toner image on an image transfer surface based on input image data and to transfer the toner image to an output media to form a printed image. The image transfer surface sensor is configured to measure the toner image on the image transfer surface to obtain toner image data. The toner image data comprises a set of image transfer surface contone values representative of an area coverage of the toner image on the image transfer surface. The printed image sensor is configured to measure the printed image on the output media to obtain printed image data. The printed image data comprises a set of print contone values representative of an area coverage of the printed image on the output media. The processor is configured to: a) generate an actual printed image tone reproduction curve using the printed image data; b) determine a set of adjusted contone values by comparing the actual printed image tone reproduction curve with a target printed image tone reproduction curve, the adjusted contone values being representative of the print contone values at which target color density data of the printed image is achieved in the image printing system; and c) determine adjusted image transfer surface reflectance data to update a target image transfer surface tone reproduction curve, the adjusted image transfer surface reflectance data being obtained by interpolating the target image transfer surface tone reproduction curve at the adjusted contone values. The controller is configured to control subsequent toner image data from the image transfer surface to achieve the updated target image transfer tone reproduction curve.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
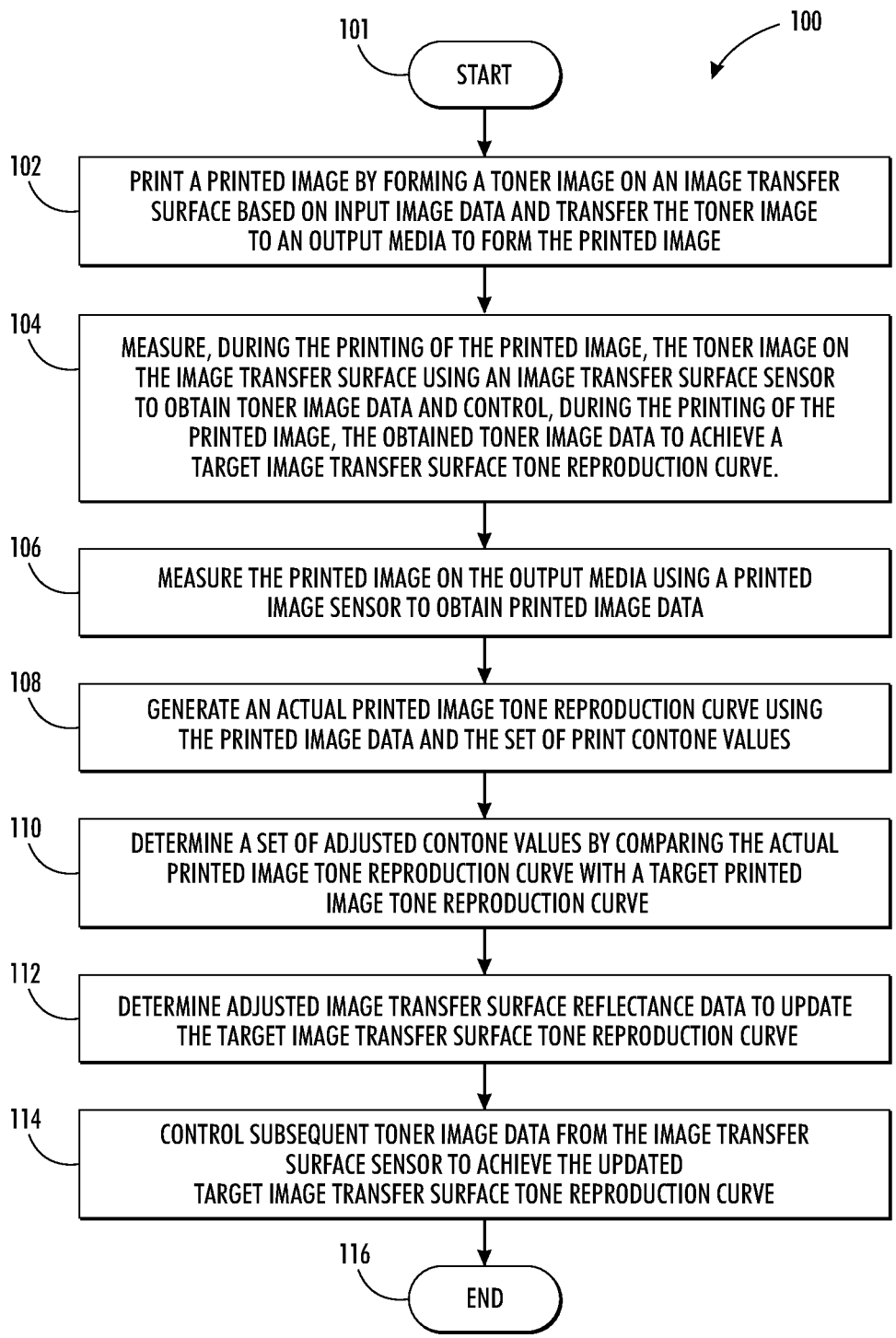
FIG. 1 illustrates a method for controlling a tone reproduction curve of an image printing system in accordance with an embodiment of the present disclosure.
Figure 2:
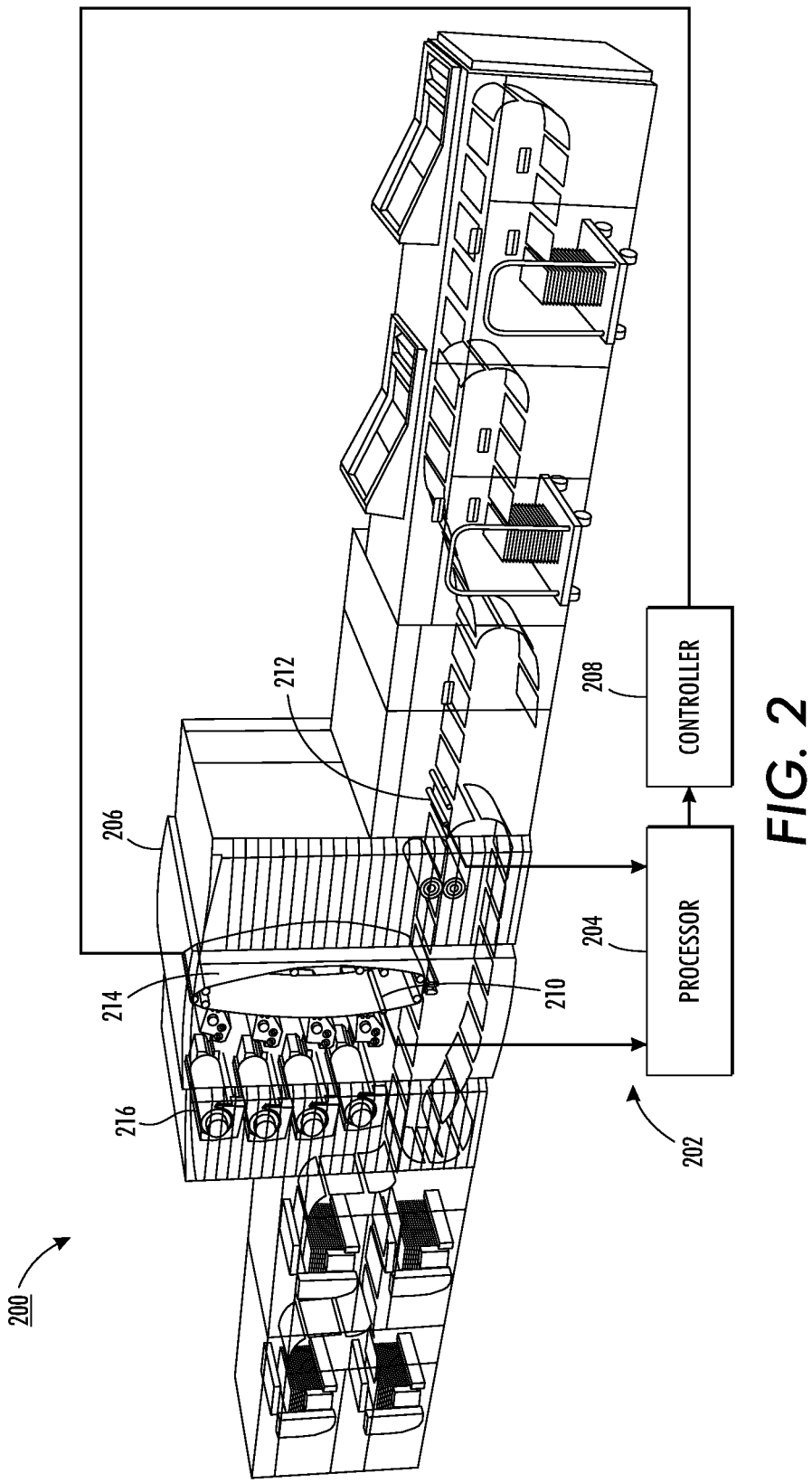
FIG. 2 illustrates an exemplary image printing system incorporating a system for controlling the tone reproduction curve of the image printing system in accordance with an embodiment of the present disclosure.

A method 100 and a system 202 for controlling a tone reproduction curve of an image printing system 200 in accordance with an embodiment of the present disclosure are shown in FIGS. 1 and 2, respectively.

The method 100 of the present disclosure updates a target image transfer surface TRC for an on-belt TRC control system to achieve a desired printed image TRC. The target image transfer surface TRC is updated using the following: a) current (or initial) target image transfer surface TRC (used for on-belt control system); b) current (or actual or measured) printed image TRC (with on-belt control), for example, measured using an in-line spectrophotometer (ILS); and c) target or desired printed image TRC. The updated target image transfer surface TRC is determined by interpolating the current (or initial) target image transfer surface TRC and the actual (or current) printed image TRC at the target (or the desired) printed image TRC. Procedures 110-114 of the method 100 (and FIGS. 1, and 3-6) provide detailed explanation of how the updated target image transfer surface TRC is determined. This updated target image transfer surface TRC is then used by the on-belt TRC control system to achieve the target or the desired printed image TRC. As will be clear from the discussions below, the (image transfer surface) contone locations used for on-belt digital TRC control may or may not be identical to the (printed image) contone locations measured for calibration (ILS print measurements).

FIG. 1 provides the method 100 for controlling a tone reproduction curve of the image printing system 200 (as shown in FIG. 2) in accordance with an embodiment of the present disclosure. The method 100 is a computer-implemented method that is implemented in a computer system comprising one or more processors 204 (as shown in and explained with respect to FIG. 2) configured to execute one or more computer program modules.

The method 100 begins at procedure 101. At procedure 102, a printed image is printed. That is, a toner image is first formed on an image transfer surface 214 (as shown in and explained with respect to FIG. 2) based on (received) input image data. The toner image is then transferred to an output media to form the printed image.

A user may access and operate the image printing system 200 using a graphical user interface or via a workstation. The graphical user interface or workstation communicates with the image printing system 200 via a network. A digital front end (DFE) processes image data received from the workstation or memory and converts the image data into binary print ready data that is supplied to a print engine 206 (as shown in and explained with respect to FIG. 2). In response to the print ready data, the print engine 206 generates the printed image on the output media.

The method 100 then proceeds to procedure 104. At procedure 104, the toner image on the image transfer surface 214 is measured using an image transfer surface sensor 210 (as shown in and explained with respect to FIG. 2) to obtain toner image data. The toner image data is measured during the printing of the printed image.

The image transfer surface sensor 210 may include at least one of an enhanced toner area coverage sensor (ETAC), an electrostatic voltage sensor (ESV), a full width array (FWA) sensor, and a residual mass per area (RMA) sensor.

The toner image data includes a set of image transfer surface contone values representative of an area coverage of the toner image on the image transfer surface 214.

An actual image transfer surface TRC is generated by the processor 204 using the toner image data. The actual image transfer surface TRC depicts measured reflectance data (from the image transfer surface sensor 210) of the toner image at different image transfer surface contone values. That is, the actual image transfer surface TRC generally relates image transfer surface contone values at a dot or a pixel in the toner image to actual or measured reflectance data of the toner image.

The actual image transfer surface TRC is then controlled to achieve a target image transfer surface TRC. In one embodiment, the target image transfer surface TRC is predetermined.

The target image transfer surface TRC depicts desired reflectance data of the toner image at different image transfer surface contone values. That is, the target or desired image transfer surface TRC generally relates image transfer surface contone values at a dot or a pixel in the toner image to desired reflectance data of the toner image.

The method 100 then proceeds to procedure 106. At procedure 106, the printed image on the output media is measured using the printed image sensor 212 to obtain printed image data. The printed image data includes a set of print contone values representative of an area coverage of the printed image on the output media.

The printed image sensor 212 may include at least one of a spectrophotometer, a densitometer, a colorimeter, a spectrometer, and a spectral camera.

The method 100 then proceeds to procedure 108. At procedure 108, an actual printed image tone reproduction curve is generated by the processor 204 using the printed image data. In one embodiment, the actual printed image tone reproduction curve depicts measured color density (from the printed image sensor 212) of the printed image at different print contone values. In one embodiment, the color density of the printed image is measured in delta-E (dE) units.

In one embodiment, the actual printed image data obtained from the printed image sensor 212 is controlled to achieve a desired or target printed image tone reproduction curve. In one embodiment, the target printed image tone reproduction curve is predetermined. The target printed image tone reproduction curve depicts desired color density of the printed image at different print contone values.

Figure 3:
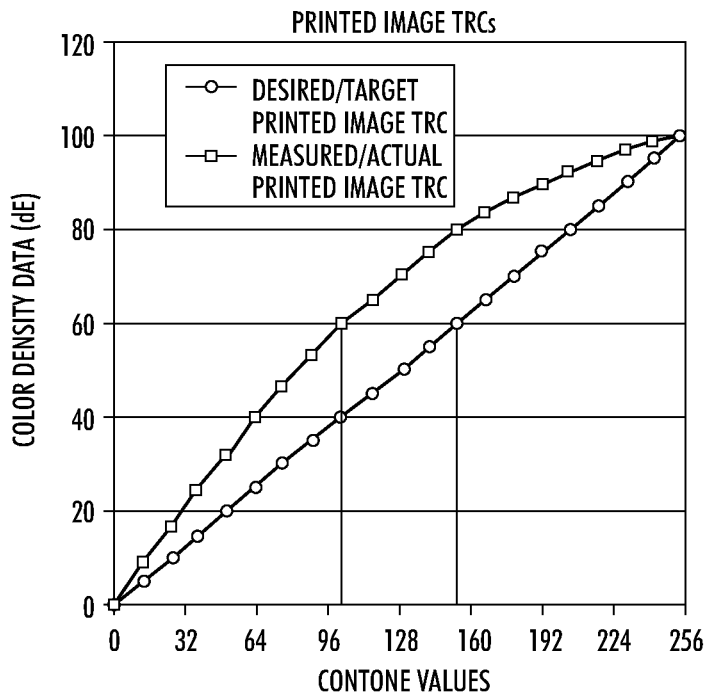
FIG. 3 illustrates exemplary graphical representations of an actual printed image tone reproduction curve (TRC) and a target printed image TRC in accordance with an embodiment of the present disclosure.

FIG. 3 illustrates exemplary graphical representations of the actual (or current) printed image TRC at print contone values and the target (or desired) printed image TRC at print contone values in accordance with an embodiment of the present disclosure. The actual printed image tone reproduction curve generally relates print contone values at a dot or a pixel in the printed image to actual or measured color density data of the printed image. The target or desired printed image tone reproduction curve generally relates print contone values at a dot or a pixel in the printed image to desired color density data of the printed image.

TABLE 1 below shows exemplary print contone values and exemplary target or desired color density values of the printed image of target printed image TRC. The printed image contone values form the X-axis data and the target or desired color density values (of the printed image) form the Y-axis data for the target printed image TRC shown in FIG. 3.

TABLE 1

| Target Printed Image TRC | |
| --- | --- |
| Print Contone Values | Target or Desired Color Density Values (in Delta-E (DE) units) of the Printed Image |
| 0 | 0 |
| 13 | 5 |
| 26 | 10 |
| 38 | 15 |
| 51 | 20 |
| 64 | 25 |
| 76 | 30 |

TABLE 1-continued

| Target Printed Image TRC | |
| --- | --- |
| Print Contone Values | Target or Desired Color Density Values (in Delta-E (DE) units) of the Printed Image |
| 89 | 35 |
| 102 | 40 |
| 115 | 45 |
| 128 | 50 |
| 140 | 55 |
| 153 | 60 |
| 166 | 65 |
| 178 | 70 |
| 191 | 75 |
| 204 | 80 |
| 217 | 85 |
| 230 | 90 |
| 242 | 95 |
| 255 | 100 |

TABLE 2 below shows exemplary print contone values and exemplary actual or measured color density values of the printed image of actual printed image TRC. The print contone values form the X-axis data and the actual color density values (of the printed image) form the Y-axis data for the actual printed image TRC shown in FIG. 3. As noted above, the actual color density values of the printed image is obtained from the printed image sensor 212.

TABLE 2

| Actual Printed Image TRC | |
| --- | --- |
| Print Contone Values | Actual Color Density Values (in Delta-E (DE) units) of the Printed Image |
| 0 | 0 |
| 13 | 8 |
| 26 | 16 |
| 38 | 24 |
| 51 | 32 |
| 64 | 39 |
| 76 | 46 |
| 89 | 53 |
| 102 | 59 |
| 115 | 65 |
| 128 | 70 |
| 140 | 75 |
| 153 | 79 |
| 166 | 83 |
| 178 | 86 |
| 191 | 89 |
| 204 | 92 |
| 217 | 94 |
| 230 | 96 |
| 242 | 98 |
| 255 | 100 |

TRC Linearization is accomplished through procedures 110-114 described below. At procedure 110 of the method 100, a set of adjusted or linearlized contone values are determined by the processor 204. The set of adjusted contone values are determined by comparing the actual printed image TRC with the target printed image TRC. The adjusted contone values are representative of the print contone values at which target or desired color density data of the printed image is achieved in the image printing system.

In one embodiment, the linearized or adjusted contone values are determined by linearly interpolating a) the print contone values and b) the measured or actual color density values (from the printed image sensor 212) of the printed image (e.g., at 21 data points measured with on-belt control) at the target or desired color density values of the printed image. Interpolation (i.e., a method of curve fitting using polynomials) of data is generally known in the art, and hence will not be described in detail here.

Figure 4:
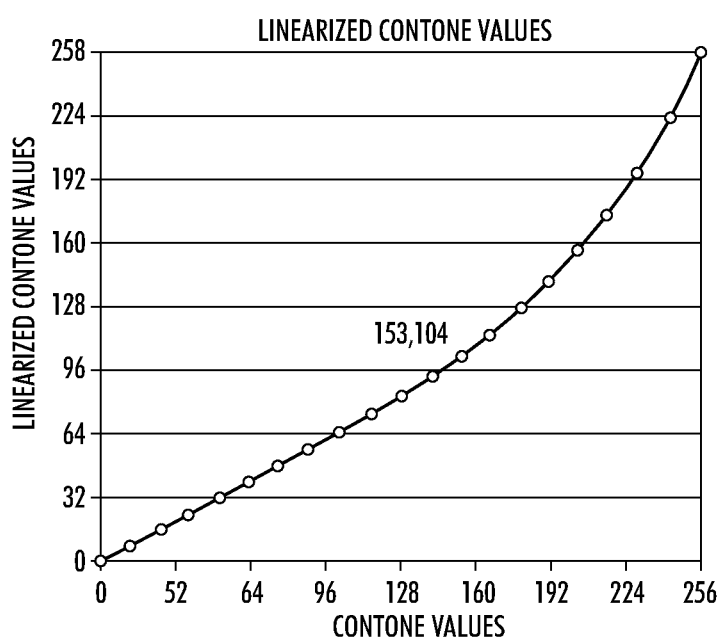
FIG. 4 illustrates an exemplary graphical representation of linearized (or adjusted) contone values at each of print contone values in accordance with an embodiment of the present disclosure.

The linearized or adjusted contone value that corresponds to each print contone value is calculated. For example, as shown in FIGS. 3 and 4 and TABLE 3, the linearized or adjusted contone value that corresponds to the print contone value 153 is 104. In other words, the linearized or adjusted contone value 104 produces the correct color density value of the printed image in the current image printing system. FIG. 4 and TABLE 3 show the linearized contone value at each of the 21 different print contone values or locations. These linearized contone values achieve the desired or target printed image TRC. In one embodiment, the measurements of the printed image are made with the on-belt digital TRC control system enabled.

TABLE 3 below shows exemplary print contone values and (exemplary) corresponding linearized contone values. The print contone values form the X-axis data and the linearized contone values form the Y-axis data in the exemplary graphical representation of FIG. 4.

TABLE 3

Linearized or Adjusted Contone Values

| Print Contone Values | Linearized or Adjusted Contone Values |
|---|---|
| 0 | 0 |
| 13 | 8 |
| 26 | 16 |
| 38 | 24 |
| 51 | 32 |
| 64 | 40 |
| 76 | 48 |
| 89 | 57 |
| 102 | 65 |
| 115 | 74 |
| 128 | 84 |
| 140 | 94 |
| 153 | 104 |
| 166 | 116 |
| 178 | 128 |
| 191 | 141 |
| 204 | 156 |
| 217 | 174 |
| 230 | 195 |
| 242 | 223 |
| 255 | 255 |

The method 100 then proceeds to procedure 112. At procedure 112, adjusted image transfer surface reflectance data is determined by the processor 204. The adjusted image transfer surface reflectance data is determined to update the target image transfer surface TRC. The adjusted image transfer surface reflectance data is obtained by interpolating the target image transfer surface TRC at the adjusted or linearized contone values.

TABLE 4 below shows exemplary image transfer surface contone values and (exemplary) corresponding reflectance data of the toner image (on the image transfer surface) of the current (or initial) target (or desired) image transfer surface TRC. The image transfer surface contone values form the X-axis data and the reflectance data form the Y-axis data for the current target image transfer surface TRC shown in FIG. 5.

TABLE 4

Current or initial Target Image Transfer Surface TRC

| Image Transfer Surface Contone Values | Reflectance Data |
|---|---|
| 0 | 4095 |
| 21 | 3630 |
| 42 | 3173 |
| 63 | 2733 |
| 84 | 2316 |
| 106 | 1910 |
| 127 | 1556 |
| 148 | 1234 |
| 170 | 932 |
| 191 | 673 |
| 212 | 438 |
| 234 | 209 |
| 255 | 53 |

TABLE 5 below shows exemplary print contone values and (exemplary) corresponding normalized or adjusted or linearized reflectance data of the toner image (on the image transfer surface) of the updated target (or desired) image transfer surface TRC. The linearized reflectance data in TABLE 5 is obtained at 21 print contone values.

TABLE 5

Linearized Reflectance Data

| Print Contone Values | Linearized Reflectance Data |
|---|---|
| 0 | 4095 |
| 13 | 3919 |
| 26 | 3743 |
| 38 | 3566 |
| 51 | 3396 |
| 64 | 3225 |
| 76 | 3046 |
| 89 | 2866 |
| 102 | 2685 |
| 115 | 2513 |
| 128 | 2325 |
| 140 | 2139 |
| 153 | 1943 |
| 166 | 1748 |
| 178 | 1540 |
| 191 | 1346 |
| 204 | 1119 |
| 217 | 887 |
| 230 | 627 |
| 242 | 321 |
| 255 | 53 |

The linearized (or adjusted or normalized) image transfer surface reflectance data (i.e., right column in TABLE 5 above) is obtained at the print contone values by linearly interpolating the current or initial target image transfer surface TRC (reflectance data (i.e., left column of TABLE 4) and the image transfer surface contone values (i.e., right column of TABLE 4)) at each of the linearized or adjusted contone values (i.e., left column of TABLE 3). The desired or target printed image TRC is taken into account (for calculation of the updated target image transfer surface TRC) through these linearized contone values.

In one embodiment, as shown in TABLE 2, the color density values (from the printed image sensor 212) of the printed image are measured at 21 different print contone locations. However, the number of print contone locations (where the color density values are measured) can vary significantly in number. In one embodiment, the reflectance data of the toner image is measured at 14 different image transfer surface contone locations. However, the number of image transfer surface contone locations (where the reflectance data is measured) can vary significantly in number.

Figure 5:
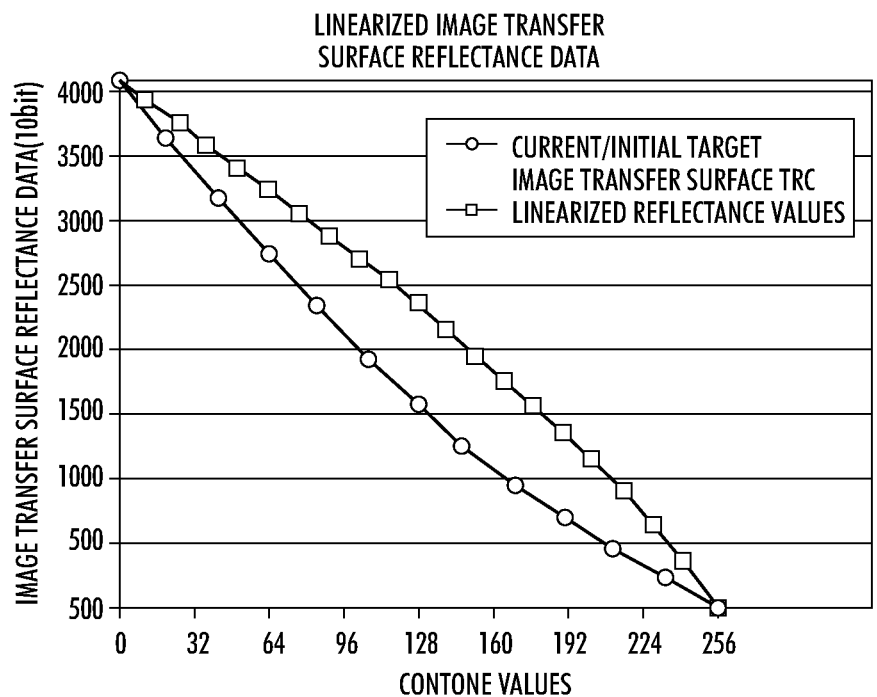
FIG. 5 illustrates exemplary graphical representations of a current (or initial) target image transfer surface TRC at different image transfer surface contone values and of adjusted or linearized image transfer surface reflectance data at different print contone values in accordance with an embodiment of the present disclosure.
Figure 6:
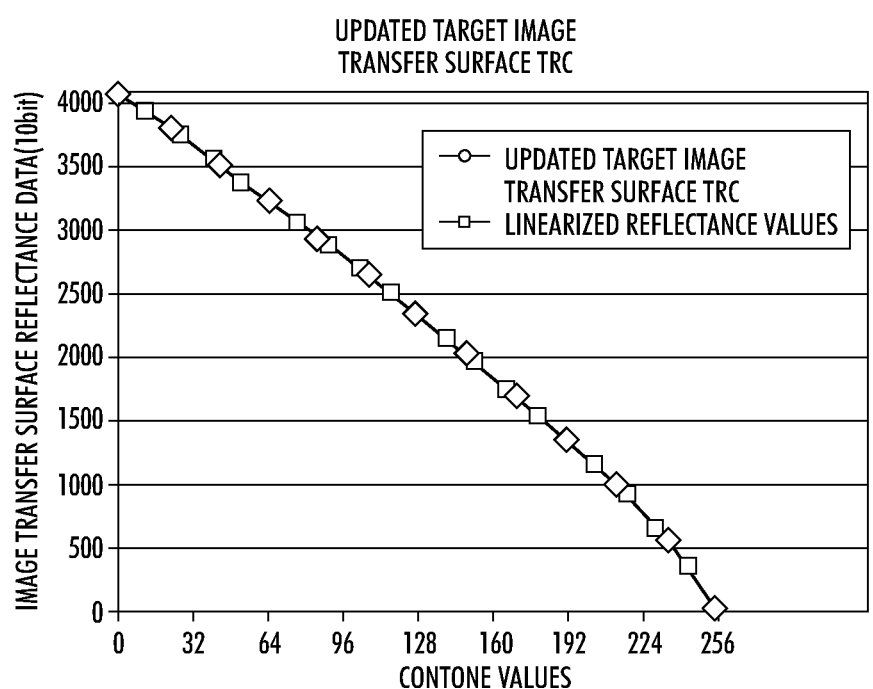
FIG. 6 illustrates exemplary graphical representations of adjusted or linearized image transfer surface reflectance data at different print contone values and of updated target image transfer surface TRC at different image transfer surface contone values in accordance with an embodiment of the present disclosure.
Figure 7:
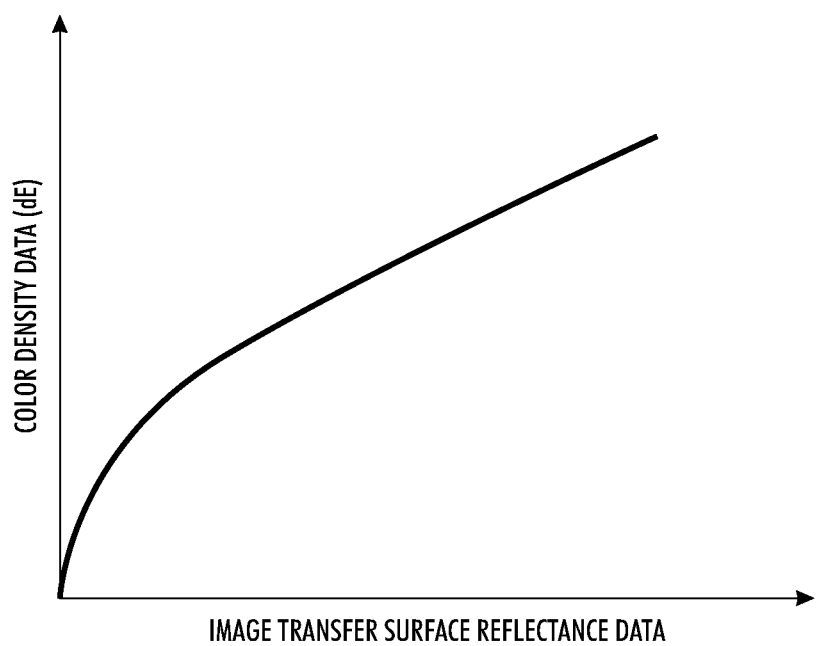
FIG. 7 illustrates an exemplary graphical representation of the relationship between reflectance data from the toner image on the image transfer surface and color density data from the printed image.

When the number of print contone locations are different from the number of image transfer surface contone locations, then the linearized or adjusted or normalized reflectance data (shown in TABLE 5 and FIG. 5) at the print contone values are linearly interpolated at the image transfer surface contone values to determine the updated target image transfer surface TRC (shown in TABLE 6 and FIG. 6). That is, the updated target image transfer surface TRC is obtained by linearly interpolating the linearized reflectance data (i.e., at 21 different print contone values) at the 14 different image transfer surface contone values. This interpolation is shown in FIG. 6. The data of this updated target image transfer surface TRC is shown in TABLE 6 below. Therefore, when the number of print contone locations is different from the number of image transfer surface contone locations, the procedures shown in FIGS. 3-6 may be used to determine the updated target image transfer surface TRC.

TABLE 6 below shows exemplary image transfer surface contone values and (exemplary) corresponding normalized or adjusted or linearized reflectance data of the toner image (on the image transfer surface) of the updated target (or desired) image transfer surface TRC. The linearized reflectance data in TABLE 6 is obtained at 14 image transfer surface contone values.

TABLE 6

Updated Target Image Transfer Surface TRC

| Image Transfer Surface Contone Values | Reflectance Data |
|---|---|
| 0 | 4095 |
| 21 | 3811 |
| 42 | 3514 |
| 63 | 3238 |
| 84 | 2935 |
| 106 | 2632 |
| 127 | 2339 |
| 148 | 2018 |
| 170 | 1679 |
| 191 | 1346 |
| 212 | 976 |
| 234 | 525 |
| 255 | 53 |

In another embodiment, the print contone locations may be equal to the image transfer surface contone locations. That is, the contones used for on-belt TRC control may be equal to the contones used for print calibration. This greatly simplifies the procedure to update the on-belt target TRC. In such an embodiment, a single interpolation step is carried out to determine the updated target image transfer surface TRC. Specifically, the actual printed image TRC and the current target image transfer surface TRC are interpolated at the target color density values (dE values) of the printed image to determine the updated target image transfer surface TRC. Therefore, when the number of print contone locations are same as the number of image transfer surface contone locations, the procedures shown in FIGS. 3-5 are used to determine the updated target image transfer surface TRC.

The method 100 then proceeds to procedure 114. At procedure 114, subsequent toner image data from the image transfer surface sensor is controlled (by a controller 208 as shown and explained with respect to FIG. 2)) to achieve the updated target image transfer surface tone reproduction curve. The updated target image transfer surface tone reproduction curve is used for color calibration and spatial correction of the image printing system. The method 100 ends at procedure 116.

FIG. 2 shows the exemplary image printing system 200 incorporating the system 202 (i.e., for controlling a tone reproduction curve of the image printing system) of the present disclosure. The system 202 includes the print engine 206, the processor 204, the controller 208, the image transfer surface sensor 210, and the printed image sensor 212.

As illustrated, the print engine 206 is a multi-color engine having a plurality of imaging/development subsystems (e.g., CMYK) 216, that are suitable for forming individual color toner images (i.e., based on input image data) on the image transfer surface 214, where the image transfer surface 214 then transfers the toner images to an output media to form printed image thereon. The image printing system 200 also includes a source of paper or printable substrates.

As is generally known, to generate an output copy of an input document, the image transfer surface 214 is charged using a corona charger (not shown) and then exposed to a raster output scanner (laser) (not shown) to form the latent image on the image transfer surface 214. Toner is applied to the latent image from a plurality of developer units 216. The toner applied to the latent image is transferred to the output media at a transfer station. The output media is moved by a transport mechanism to a fuser so that the toner is permanently affixed to the output media.

Referring to FIG. 2, the print engine 206 is configured to form a toner image on the image transfer surface 214 based on input image data and to transfer the toner image data to an output media to form the printed image.

The image transfer surface sensor 210 is configured to measure the toner image on the image transfer surface 214 to obtain toner image data. The toner image data includes a set of image transfer surface contone values representative of an area coverage of the toner image on the image transfer surface 214.

The image transfer surface sensor 210 may include at least one of an enhanced toner area coverage sensor, an electrostatic voltage sensor, a full width array (FWA) sensor, and a residual mass per area (RMA) sensor.

The toner image data obtained from the image transfer surface sensor 210 is controlled by the controller 208 to achieve a target image transfer surface tone reproduction curve. In one embodiment, the target image transfer surface tone reproduction curve is predetermined.

The printed image sensor 212 is configured to measure the printed image on the output media to obtain printed image data. The printed image data includes a set of print contone values representative of an area coverage of the printed image on the output media. The printed image data obtained from the printed image sensor 212 is controlled to achieve a target printed image tone reproduction curve. In one embodiment, the target printed image tone reproduction curve is predetermined.

The printed image sensor 212 may include at least one of a spectrophotometer, a densitometer, a colorimeter, a spectrometer, and a spectral camera.

The processor 204 can comprise either one or a plurality of processors therein. Thus, the term "processor" as used herein broadly refers to a single processor or multiple processors. In one embodiment, the processor 204 can be a part of or forming a computer system. The system 200 may include a memory to store data received and data generated by the processor 204.

The processor 204 is configured to: a) generate an actual printed image tone reproduction curve using the printed image data and the set of print contone values; b) determine a set of adjusted contone values by comparing the actual printed image tone reproduction curve with a target printed image tone reproduction curve, the adjusted contone values being representative of the print contone values at which target color density data of the printed image is achieved in the image printing system; and c) determine adjusted image transfer surface reflectance data to update a target image transfer surface tone reproduction curve, the adjusted image transfer surface reflectance data being obtained by interpolating the target image transfer surface tone reproduction curve at the adjusted contone values.

The controller 208 is configured to control subsequent toner image data from the image transfer surface to achieve the updated target image transfer tone reproduction curve.

The method 100 and the system 202 of the present disclosure provides a correlation between the color density values (measured in Delta-E (dE) units) of the printed image and desired or target reflectance data (not measured data) of the toner image on the image transfer surface. Such correlation may be used for calibration of the image printing system 200. That is, by using this correlation the on-belt reflectance targets are chosen to achieve the desired dE on paper. Since the target reflectance of the toner image on the image transfer surface is based on the current target reflectance (rather than measured reflectance values), the on-belt reflectance target is updated in a closed-loop fashion. That is, there is a feedback on how well the target reflectance of the toner image on the image transfer surface achieves the desired color density values of the printed image (i.e., desired printed image TRC)). The target reflectance of the toner image on the image transfer surface is also independent of the actual digital TRC correction.

The closed loop control provided by the method and the system of the present disclosure corrects errors in the current state. Also, the method and the system of the present disclosure do not include any alignment procedure to align the ILS cross-process location with the input image module's full process width measurements. Also, in the method and the system of the present disclosure, a different unique set of contone values may be used for on-belt control and for paper calibration (as explained above). In contrast to the conventional methods, quiet level dots (which requires dot switching in the contone rendering module (CRM) outlining algorithms or methods) are not printed in the method and the system of the present disclosure.

The present disclosure thus provides a closed loop system that not only corrects uniformity errors but also controls absolute color in the image printing system. This closed loop system is generally referred to as "Digital TRC Control". That is, the closed loop system has the ability to correct to an absolute target (or aim) TRC rather than the measured TRC at some reference location.

The present disclosure describes the method for determining the absolute TRC target on the belt. With digital TRC control, the absolute TRC target used for on-belt control ultimately affects the color on paper. Thus, defining this target serves as the color calibration for the image printing system. Also, this color calibration is unique for each halftone screen.

The embodiments described may also be advantageously used for tightly integrated parallel printing (TIPP) systems. Such systems are known where multiple printers are controlled to output a single print job, as disclosed in U.S. Pat. Nos. 7,136,616 and 7,024,152, each of which herein is incorporated by reference in its entirety.

The term "media," as used herein, may include a sheet of paper, such as a standard 8½×11 inch letter paper, A4 paper, or 8½×14 inch legal paper. However, it will be appreciated that "media" may include other sizes and printable media types, such as, bond paper, parchment, cloth, cardboard, plastic, transparencies, film, foil, or other print media substrates. Any reference to paper is not to be construed as limiting. Different grade and/or gloss media may be used.

The image transfer surface 208 is at least one of a photoreceptor drum, a photoreceptor belt, an intermediate transfer belt, an intermediate transfer drum, and other image transfer surfaces. That is, the term image transfer surface 208 means any surface on which an image is received, and this may be an intermediate surface (i.e., a drum or belt on which an image is formed prior to transfer to a printed document).

The word "image printing system" as used herein encompasses any device, such as a copier, bookmaking machine, facsimile machine, or a multi-function machine. In addition, the word "image printing system" may include ink jet, laser or other pure printers, which performs a print outputting function for any purpose.

In the embodiments of the present disclosure, the processor, for example, may be made in hardware, firmware, software, or various combinations thereof. The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for controlling a tone reproduction curve (TRC) of an image printing system, wherein the method is implemented in a computer system comprising one or more processors configured to execute one or more computer program modules, the method comprising:

printing a printed image by forming a toner image on an image transfer surface based on input image data and transferring the toner image to an output media to form the printed image;

measuring, during the printing of the printed image, the toner image on the image transfer surface using an image transfer surface sensor to obtain toner image data, wherein the toner image data comprises a set of image transfer surface contone values representative of an area coverage of the toner image on the image transfer surface;

controlling the toner image data to achieve a target image transfer surface tone reproduction curve;

measuring the printed image on the output media using a printed image sensor to obtain printed image data, wherein the printed image data comprises a set of print contone values representative of an area coverage of the printed image on the output media;

generating an actual printed image tone reproduction curve using the printed image data;

determining a set of adjusted contone values by comparing the actual printed image tone reproduction curve with a target printed image tone reproduction curve, the adjusted contone values being representative of the print contone values at which target color density data of the printed image is achieved in the image printing system;

determining adjusted image transfer surface reflectance data to update the target image transfer surface tone reproduction curve, the adjusted image transfer surface reflectance data being obtained by interpolating the target image transfer surface tone reproduction curve at the adjusted contone values; and controlling subsequent toner image data from the image transfer surface sensor to achieve the updated target image transfer surface tone reproduction curve.

2. The method of claim 1, further comprises using the updated target image transfer surface tone reproduction curve for color calibration and spatial correction of the image printing system.

3. The method of claim 1, further comprises interpolating the updated target image transfer surface tone reproduction curve at the image transfer surface contone values, when the print contone values are different from the image transfer surface contone values.

4. The method of claim 1, wherein the printed image sensor comprises at least one of a spectrophotometer, a densitometer, a colorimeter, a spectrometer, and a spectral camera.

5. The method of claim 1, wherein the image transfer surface sensor comprises at least one of an enhanced toner area coverage sensor, an electrostatic voltage sensor, a full width array (FWA) sensor, and a residual mass per area (RMA) sensor.

6. A system for controlling a tone reproduction curve (TRC) of an image printing system, the system comprising:

a print engine configured to form a toner image on an image transfer surface based on input image data and to transfer the toner image to an output media to form a printed image;

an image transfer surface sensor configured to measure the toner image on the image transfer surface to obtain toner image data, wherein the toner image data comprises a set of image transfer surface contone values representative of an area coverage of the toner image on the image transfer surface;

a printed image sensor configured to measure the printed image on the output media to obtain printed image data, wherein the printed image data comprises a set of print contone values representative of an area coverage of the printed image on the output media;

a processor configured to:
  a) generate an actual printed image tone reproduction curve using the printed image data;
  b) determine a set of adjusted contone values by comparing the actual printed image tone reproduction curve with a target printed image tone reproduction curve, the adjusted contone values being representative of the print contone values at which target color density data of the printed image is achieved in the image printing system; and
  c) determine adjusted image transfer surface reflectance data to update a target image transfer surface tone reproduction curve, the adjusted image transfer surface reflectance data being obtained by interpolating the target image transfer surface tone reproduction curve at the adjusted contone values; and a controller configured to control subsequent toner image data from the image transfer surface to achieve the updated target image transfer tone reproduction curve.

7. The system of claim 6, wherein the updated actual image transfer surface tone reproduction curve is used for color calibration and spatial correction of the image printing system.

8. The system of claim 6, wherein the updated target image transfer surface tone reproduction curve is interpolated at the image transfer surface contone values, when the print contone values are different from the image transfer surface contone values.

9. The system of claim 6, wherein the printed image sensor comprises at least one of a spectrophotometer, a densitometer, a colorimeter, a spectrometer, and a spectral camera.

10. The system of claim 6, wherein the image transfer surface sensor comprises at least one of an enhanced toner area coverage sensor, an electrostatic voltage sensor, a full width array (FWA) sensor, and a residual mass per area (RMA) sensor.

* * * * *